United States Patent [19]
Ro et al.

[11] Patent Number: 6,030,677
[45] Date of Patent: Feb. 29, 2000

[54] HIGH-DENSITY OPTICAL DISK AND METHOD OF PRODUCING THE SAME

[75] Inventors: Myong-do Ro; Byeung-Lyong Gill, both of Kyungki-do, Rep. of Korea

[73] Assignee: Samsung Electronics Co., Ltd., Suwon, Rep. of Korea

[21] Appl. No.: 09/001,665

[22] Filed: Dec. 31, 1997

[30] Foreign Application Priority Data

Apr. 18, 1997 [KR] Rep. of Korea ........................ 97-14528

[51] Int. Cl.[7] ...................................... B32B 3/00
[52] U.S. Cl. .................... 428/64.1; 428/64.2; 428/64.4; 428/457; 428/688; 428/913; 430/270.11; 430/495.1; 430/945; 369/275.1; 369/283; 369/288
[58] Field of Search ................................. 428/64.1, 64.2, 428/64.4, 65.2, 457, 688, 913; 430/270.11, 495.1, 945; 369/275.1, 283, 288

[56] References Cited

U.S. PATENT DOCUMENTS

| | | | |
|---|---|---|---|
| 5,805,563 | 9/1998 | Nakano | 369/275.1 |
| 5,862,121 | 1/1999 | Suzuki | 369/275.1 |
| 5,871,881 | 2/1999 | Nishida et al. | 430/270.11 |

*Primary Examiner*—Elizabeth Evans
*Attorney, Agent, or Firm*—Staas & Halsey

[57] ABSTRACT

A high-density optical disk includes reflective layers respectively formed at both information-recorded surfaces of a first substrate, and semitransparent layers respectively formed at one information-recorded surface of each of second and third substrates. The second and third substrates are respectively bonded at both sides of the first substrate.

33 Claims, 1 Drawing Sheet

HIGH-DENSITY OPTICAL DISK AND METHOD OF PRODUCING THE SAME

BACKGROUND OF THE INVENTION

1. Field of the Invention

The present invention relates to an optical recording medium from which recorded information is reproduced by using a laser and method of producing the same and, more particularly, to a high-density recording medium which can densely record the information and from which the information is reproduced.

2. Description of the Related Art

Recently, a study of a high-density optical disk which is spotlighted as audio and video recording media has actively been made. A digital video disk (DVD) system which is a representative example of an information transmission medium of high picture quality and high sound quality has brought about the concept of a multimedia age combining digital video information with audio information. The birth of the DVD system includes prospects for a vast commercial market as a substitute demand for video cassette recorders and laser disks which are analog video systems, in addition to achieving technical innovation regarding the digitization of the video and audio information. Therefore, a fabrication method of a high-density substrate which can increase recording capacity has been demanded to provide for a next generation multimedia market.

A technique for fabricating the high-density substrate is disclosed in Korean Patent Application No. 95-1802, assigned to the same assignee as the present invention. In the above Korean Patent Application No. 95-1802, as shown in FIG. 1 of the present application, a semitransparent layer 2 and a protective layer 4B are sequentially formed at the lower portion of a substrate 1 having grooves and pits formed at both of its surfaces. At the upper portion of the substrate 1, a reflective layer 3 and a protective layer 4A are sequentially formed. However, if there is dust or a contaminant in the incident direction of a light beam, the above optical disk substrate may generate an error during reproduction since a spot of the light beam is scattered. The optical disk shown in FIG. 1 has the protective layers 4A and 4B, each having a thickness of 30–40 $\mu$m. Thus, if there is dust having a thickness of 5 $\mu$m in the incident direction of a light beam, the spot of the laser beam can not be focused due to the dust. Moreover, since an information surface is exposed to the exterior, the information surface may be damaged when using the disk and it is necessary to supplement the durability of the optical disk.

SUMMARY OF THE INVENTION

An object of the present invention is to provide a high-density optical disk which can increase recording capacity and ensure durability.

Another object of the present invention is to provide a high-density optical disk which can simplify work and raise yield.

Additional objects and advantages of the invention will be set forth in part in the description which follows and, in part, will be obvious from the description, or may be learned by practice of the invention.

The foregoing objects of the present invention are achieved by providing a high-density optical disk which includes reflective layers respectively formed at both information-recorded surfaces of a first substrate, and semitransparent layers respectively formed at one information-recorded surface of each of second and third substrates. The second and third substrates are respectively bonded at both sides of the first substrate.

The present invention will be more specifically described with reference to the attached drawings.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

In the following description, well known functions and constructions which may obscure the present invention are not described in detail.

Figure 3:
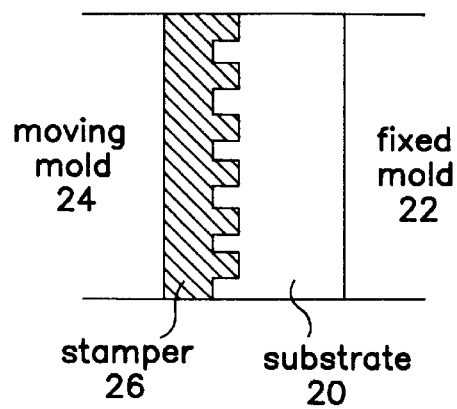
FIG. 3 is a cross-sectional view of a conventional molding machine.

To fabricate a typical optical disk, there is needed a series of processes, that is, a mastering process, a stamper making process, a disk molding process, reflective layer and protective layer forming processes, a post process, etc. The mastering process is to make a glass master by forming minute pits on a photoresist covered on a glass platter by a photolithography process. The stamper making process is to transfer the minute pits formed on the glass master onto a stamper by a nickel plating process. The disk molding process is to reproduce optical disk substrates in large quantities by using the stamper. Various disk molding processes are compression molding, injection molding, photo-polymerization (2P), etc. An example of a conventional molding machine is shown in FIG. 3 A substrate 20 is supported by a fixed mold 22. A moving mold 24 moves a stamper 26 to make minute pits in the substrate 20. The fixed mold 22 and the moving mold 24 are supported by a platen (not shown). The reflective layer and protective layer forming processes are to form a reflective layer and a protective layer. The reflective layer is typically formed by vacuum deposition or sputtering, etc. The protective layer is generally formed by spinning.

Figure 4:
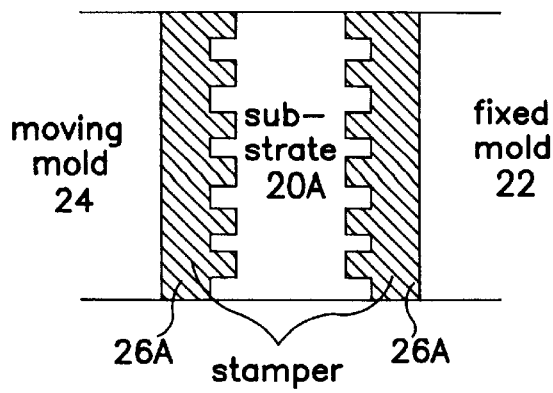
FIG. 4 is a cross-sectional view of a molding machine according to the embodiment of the present invention.

In a preferred embodiment of the present invention, unlike a conventional disk molding process (for example, injection molding), the disk is molded by fixing 2 stampers in which information is recorded to both surfaces of a molding machine. Thereafter, information-recorded pits are formed at both (two opposite) surfaces of one substrate. FIG. 4 shows an example of a molding machine having two stampers 26A and 26B. The substrate 20A (10 in FIG. 2) is supported on the stamper 26B. The moving mold 24 moves the stamper 26A so that both the stamper 26A and the stamper 26B make minute pits in respective surfaces of the substrate 20A. When forming the reflective layer, a target is put at both surfaces of a chamber of a sputter device so as to simultaneously form the reflective layers at both surfaces of one substrate.

Figure 1:
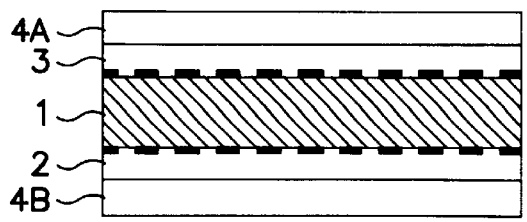
FIG. 1 is a cross-sectional view of a conventional optical disk.
Figure 2:
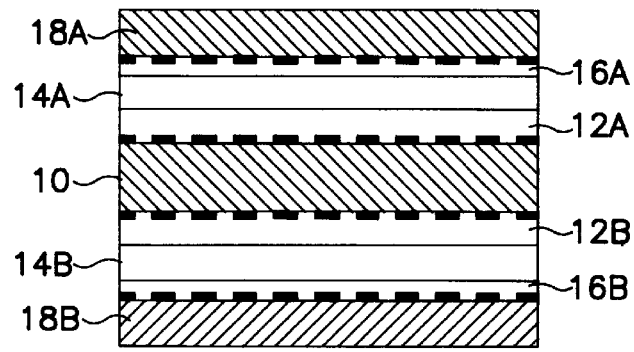
FIG. 2 is a cross-sectional view of an optical disk according to an embodiment of the present invention.

In the stamper making process for making the stampers, a track pitch is set to 0.6 $\mu$m for example. Moreover, the substrate structure indicated in FIG. 1 is modified. That is, as shown in FIG. 2, substrates each having the thickness of 0.6 mm are respectively bonded at the upper and lower portions of a substrate of 0.6 mm or 1.2 mm having both information-recorded surfaces produced by a UV bonding method. Hence, there are 4 information surfaces.

FIG. 2 is a cross-sectional view of an optical disk according to the embodiment of the present invention. Referring to FIG. 2, on both surfaces of a substrate 10 in which pits are formed, Al reflective layers 12A and 12B, UV bonding layers 14A and 14B, semitransparent layers 16A and 16B, and substrates 18A and 18B having pits formed only at one of their surfaces are sequentially formed. Unlike a general molding method, the substrate 10 having the information-recorded pits formed at both of its surfaces is fabricated by fixing 2 stampers to both surfaces of the metal mold and molding the stampers. The substrates 18A and 18B having the information-recorded pits formed only at one of their surfaces are fabricated by fixing one stamper to one surface of the metal mold and molding the stamper. The Al or Al—Ti reflective layers 12A and 12B are respectively formed at both surfaces of the substrate 10. The SiN, SiC or Au semitransparent layers 16A and 16B are respectively formed at the pits-formed surface of each of the substrates 18A and 18B fabricated by the general molding method. After the substrate 10, and the substrates 18A and 18B are fabricated, the two substrates 18A and 18B are bonded at both surfaces of the substrate 10 by the UV bonding method. It is preferable that the thickness of each of the UV bonding layers 14A and 14B formed by the UV bonding method is 30–40 $\mu$m.

To reproduce the information from the optical disk of FIG. 2, a red laser beam of 635 nm is irradiated through the substrate 18A, thus to read the information of the upper substrate 18A. The information of an upper layer of the optical disk is reproduced by using the red laser beam passing through the semitransparent layer 16A and the UV bonding layer 14A. The information of the upper layer of the optical disk is sensed by a difference in a reflectance. The reflectance of the SiN semitransparent layer 16A (16B) is 30%, and the reflectance of the Al reflective layer 12A (12B) is 90%. The reflectance sensed by an optical pickup of the upper layer of the optical disk is 30% in case of an information layer of the semitransparent layer 16A (16B) and 44% in case of an information layer of the reflective layer 12A (12B).

In other words, the substrate 18A uses the SiC or SiN semitransparent layer 16A and the upper portion of the substrate 10 uses the Al or Al—Ti reflective layer 12A. Thus, when the red laser beam of 635 nm is detected, the reflectance sensed by the optical pickup of the upper layer of the optical disk is 30% in the case of an information layer of the semitransparent layer 16A and 44% in the case of an information layer of the reflective layer 12A. When the red laser is focused on the optical disk, the information layer of the semitransparent layer 16A is distinguishable from the information layer of the reflective layer 12A due to the difference of the reflectance therebetween.

The information of a lower layer of the optical disk is reproduced by an additional pickup installed thereat based on similar reflectances.

The following Table 1 shows the capacity of the inventive optical disk of FIG. 2 as compared with the conventional optical disk of FIG. 1.

TABLE 1

|  | minimum pit length | track pitch | channel bit length | resolution | recording capacity |
| --- | --- | --- | --- | --- | --- |
| conventional disk | 0.4 ($\mu$m) | 0.74 ($\mu$m) | 0.1333 ($\mu$m) | 0.01 ($\mu$m) | 9.4 (GB/disk) |
| inventive disk | 0.36 ($\mu$m) | 0.60 ($\mu$m) | 0.1197 ($\mu$m) | 0.01 ($\mu$m) | 30 (GB/disk) |

As shown in the above Table 1, while the conventional optical disk has a recording capacity of 9.4 Giga bytes (GB) per disk at a track pitch of 0.74 $\mu$m, the inventive optical disk has a recording capacity of 30 GB per disk at a track pitch of 0.6 $\mu$m.

The minimum pit length (pit length recorded on the optical disk) corresponds to 3 T and the channel bit length (bit length in processing data) corresponds to ⅓ of the minimum pit length. The factors having an effect on recording density are the minimum pit length, the track pitch and the number of information layers available for recording the information. The following calculation shows the recording capacity of the inventive optical disc of FIG. 2 as compared with the conventional optical disk of FIG. 1.

Recording density increment effects in view of the Minimum Pit Length $$0.4 \mu m \div 0.36 \mu m = 1.333 \qquad (a)$$

Effects in view of the Track Pitch $$0.74 \div 0.60 = 1.233 \qquad (b)$$

The number of information Layers available for recording $$4 \div 2 = 2 \qquad (c)$$

Total Recording Capacity increment effects=(a)×(b)×(c)≈3.3

The minimum pit length and the track pitch are controlled by the capacity of a LBR (laser beam recorder). When the recording capacity of the conventional DVD is compared with the recording capacity of the present invention without respect to the above LBR of one factor having an effect on the recording density, the recording density of the present invention can be twice as much as that of the conventional DVD due to structural differences between the conventional DVD and the present invention through the disk molding process.

As stated previously, since there are 4 information layers, twice the recording capacity of the conventional DVD can be obtained. The DVD system has complicated processes since there is a need to fabricate a dual layer by the photopolymerization process. However, the inventive optical disk simplifies the work without the photopolymerization process and the yield can be raised. Furthermore, by bonding the substrates of 0.6 mm to the upper and lower portions of the substrate having both information-recorded surfaces, the durability can be improved.

In addition, the inventive optical disk has the substrates 18A and 18B each having a thickness of 0.6 mm, and not the protective layers of the conventional optical disk. Therefore, even though dust forms on the optical disk, having a thickness of 5 $\mu$m, for example, in the incident direction of a light beam, it is possible for the spot of the laser beam to be focused on the optical disk because a sufficient focusing distance exists between the substrate 18A or 18B and the substrate 10.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A high-density optical disk comprising:

reflective layers respectively formed at both information-recorded surfaces of a first substrate; and semitransparent layers respectively formed at one information-recorded surface of each of second and third substrates;

wherein said second and third substrates are respectively bonded at both sides of said first substrate.

2. A high-density optical disk as claimed in claim 1, wherein said second and third substrates are bonded at said first substrate by a UV bonding method.

3. A high-density optical disk as claimed in claim 1, further comprising a first bonding layer formed between a first one of said semitransparent layers and a first one of said reflective layers; and a second bonded layer formed between a second one of said semitransparent layers and a second one of said reflective layers;

wherein each of said first and second bonding layers is 30–40 $\mu$m.

4. A high-density optical disk as claimed in claim 2, further comprising a first bonding layer formed between a first one of said semitransparent layers and a first one of said reflective layers; and a second bonded layer formed between a second one of said semitransparent layers and a second one of said reflective layers;

wherein each of said first and second bonding layers is 30–40 $\mu$m.

5. A high-density optical disk as claimed in claim 3, wherein of each of said semitransparent layers is SiC or SiN.

6. A high-density optical disk as claimed in claim 3, wherein of each of said reflective layers is aluminum.

7. A high-density optical disk as claimed in claim 3, wherein of each of said reflective layers is aluminum-titanium.

8. A high-density optical disk as claimed in claim 1, wherein said first substrate is molded after fixing two stampers each for forming the information-recorded surfaces of said first substrate to two respective surfaces of a molding machine.

9. An optical disk comprising:

a first substrate having first and second information-recorded surfaces which are opposite each other;

a second substrate having a third information-recorded surface; and a third substrate having a fourth information-recorded surface.

10. The optical disk as claimed in claim 9, wherein said first through fourth information-recorded surfaces are substantially parallel to one another.

11. The optical disk as claimed in claim 9, wherein said second, first and third substrates are formed substantially parallel to one another in that order, such that said first through fourth information-recorded surfaces are parallel to one another.

12. The optical disk as claimed in claim 9, further comprising:

a first reflective layer formed on said first information-recorded surface;

a second reflective layer formed on said second information-recorded surface;

a first semitransparent layer formed on said third information-recorded surface; and a second semitransparent layer formed on said fourth information-recorded surface.

13. The optical disk as claimed in claim 11, further comprising:

a first reflective layer formed on said first information-recorded surface;

a second reflective layer formed on said second information-recorded surface;

a first semitransparent layer formed on said third information-recorded surface; and a second semitransparent layer formed on said fourth information-recorded surface.

14. The optical disk as claimed in claim 13, further comprising:

a first bonding layer to bond with said first reflective layer and said first semitransparent layer; and a second bonding layer to bond with said second reflective layer and said second semitransparent layer.

15. The optical disk as claimed in claim 13, further comprising:

a first bonding layer to bond with said first reflective layer and said first semitransparent layer; and a second bonding layer to bond with said second reflective layer and said second semitransparent layer.

16. The optical disk as claimed in claim 12, wherein each of said second and third substrates have a thickness of 0.6 mm and said first substrate has a thickness of 0.6 or 1.2 mm.

17. The optical disk as claimed in claim 14, wherein each of said second and third substrates have a thickness of 0.6 mm and said first substrate has a thickness of 0.6 or 1.2 mm.

18. The optical disk as claimed in claim 14, wherein each of said first and second semitransparent layers is SiC or SiN.

19. The optical disk as claimed in claim 14, wherein each of said first and second semitransparent layers is aluminum.

20. The optical disk as claimed in claim 14, wherein each of said first and second semitransparent layers is aluminum-titanium.

21. The optical disk as claimed in claim 14, wherein each of said first and second bonding layers is 30–40 $\mu$m.

22. The optical disk as claimed in claim 13, wherein said first and second semitransparent layers have a reflectance of approximately 30% for respective lights irradiated through said first and second semitransparent layers from a surface opposite to that of said respective third and fourth information-recorded surfaces, said first and second reflective layers have a reflectance of approximately 90% for said respective lights, said third and fourth information-recorded surfaces have reflectances of approximately 30% for said respective lights, and said first and second information-recorded surfaces have reflectances of approximately 44% for said respective lights.

23. An optical disk comprising:

a first side having first and second information-recorded surfaces to contain first data to be reproduced by a first light irradiated toward said first side;

a second side having third and fourth information-recorded surfaces to contain second data to be reproduced by a second light irradiated toward said second side; and a first substrate having said second and third information-recorded surfaces on opposite sides thereof.

24. The optical disk as claimed in claim 23, further comprising:

a second substrate formed to face said second information-recorded surface, wherein said second substrate has a first surface facing away from said second information-recorded surface and said first information-recorded surface facing said second information-recorded surface; and a third substrate formed to face said third information-recorded surface, wherein said third substrate has a first surface facing away from said third information-recorded surface and said fourth information-recorded surface facing said third information-recorded surface.

25. The optical disk as claimed in claim 24, further comprising:

a first semitransparent layer having a first surface contacting said first information recorded surface, and a second surface;

a first bonding layer having a first surface contacting said second surface of said first semitransparent layer opposite that of said first surface of said first semitransparent layer, and a second surface;

a first reflective surface having a first surface contacting said second surface of said first bonding layer, and a second surface contacting said second information-recorded surface;

a second semitransparent layer having a first surface contacting said fourth information-recorded surface, and a second surface;

a second bonding layer having a first surface contacting said second surface of said second semitransparent layer opposite that of said first surface of said second semitransparent layer, and a second surface; and a second reflective surface having a first surface contacting said second surface of said second bonding layer, and a second surface contacting said third information-recorded surface.

26. The optical disk as claimed in claim 9, wherein said first and second information-recorded surfaces contain information to be reproduced by a first light irradiated onto a first side of the optical disk, and said third and fourth information-recorded surfaces contain information to be reproduced by a second light irradiated onto a second side of the optical disk opposite the first side.

27. The optical disk as claimed in claim 9, wherein said first and third information-recorded surfaces contain information to be reproduced by a first light irradiated onto a first side of the optical disk, and said second and fourth information-recorded surfaces contain information to be reproduced by a second light irradiated onto a second side of the optical disk opposite the first side.

28. A method of producing an optical disk, comprising the steps of:

forming pits of the first and second information-recorded surfaces onto first and second surfaces of a first substrate, respectively;

forming first and second reflective layers on said first and second information-recorded surfaces;

producing pits of third and fourth information-recorded surfaces onto first surfaces of second and third substrates, respectively;

forming first and second semitransparent layers on said third and fourth information-recorded surfaces, respectively; and bonding said first semitransparent layer to said first reflective layer using a first bonding layer therebetween, and bonding said second semitransparent layer to said second reflective layer using a second bonding layer therebetween.

29. The method as claimed in claim 28, wherein said step of forming first and second reflective layers comprises the steps of:

placing targets at first and second surfaces, respectively, of a chamber of a sputter device; and simultaneously forming said first and second reflective layers on said first and second information-recorded surfaces.

30. The method as claimed in claim 29, wherein said step of bonding comprises the step of performing a UV bonding method.

31. A method of producing an optical disk, comprising the steps of:

fixing first and second stampers form making pits of respective first and second information-recorded surfaces to a molding machine;

simultaneously forming the pits of the first and second information-recorded surfaces onto first and second surfaces of a first substrate, respectively;

simultaneously forming first and second reflective layers on said first and second information-recorded surfaces;

producing pits of third and fourth information-recorded surfaces onto first surfaces of second and third substrates, respectively;

forming first and second semitransparent layers on said third and fourth information-recorded surfaces, respectively; and bonding said first semitransparent layer to said first reflective layer using a first bonding layer therebetween, and bonding said second semitransparent layer to said second reflective layer using a second bonding layer therebetween.

32. The method as claimed in claim 31, wherein said step of simultaneously forming first and second reflective layers comprises the steps of:

placing targets at first and second surfaces, respectively, of a chamber of a sputter device; and simultaneously forming said first and second reflective layers on said first and second information-recorded surfaces.

33. The method as claimed in claim 32, wherein said step of bonding comprises the step of performing a UV bonding method.

* * * * *

UNITED STATES PATENT AND TRADEMARK OFFICE
CERTIFICATE OF CORRECTION

PATENT NO.:     6,030,677
DATED      :    February 29, 2000
INVENTOR(S):    Myong-do-RO et al.

It is certified that error appears in the above-identified patent and that said Letters Patent is hereby corrected as shown below:

Column 6, line 21, change "13" to --12--.

Signed and Sealed this

Thirteenth Day of February, 2001

*Attest:*

NICHOLAS P. GODICI

*Attesting Officer*     Acting Director of the United States Patent and Trademark Office